F. S. BALDWIN.
ZERO SETTING MECHANISM.
APPLICATION FILED SEPT. 24, 1914.

1,275,119.

Patented Aug. 6, 1918.
3 SHEETS—SHEET 1.

Witnesses
Stuart Hilder.
Frances W. Anderson.

Inventor
Frank S. Baldwin
By
C. W. Anderson for
his Attorneys

F. S. BALDWIN.
ZERO SETTING MECHANISM.
APPLICATION FILED SEPT. 24, 1914.
1,275,119.
Patented Aug. 6, 1918.
3 SHEETS—SHEET 2.
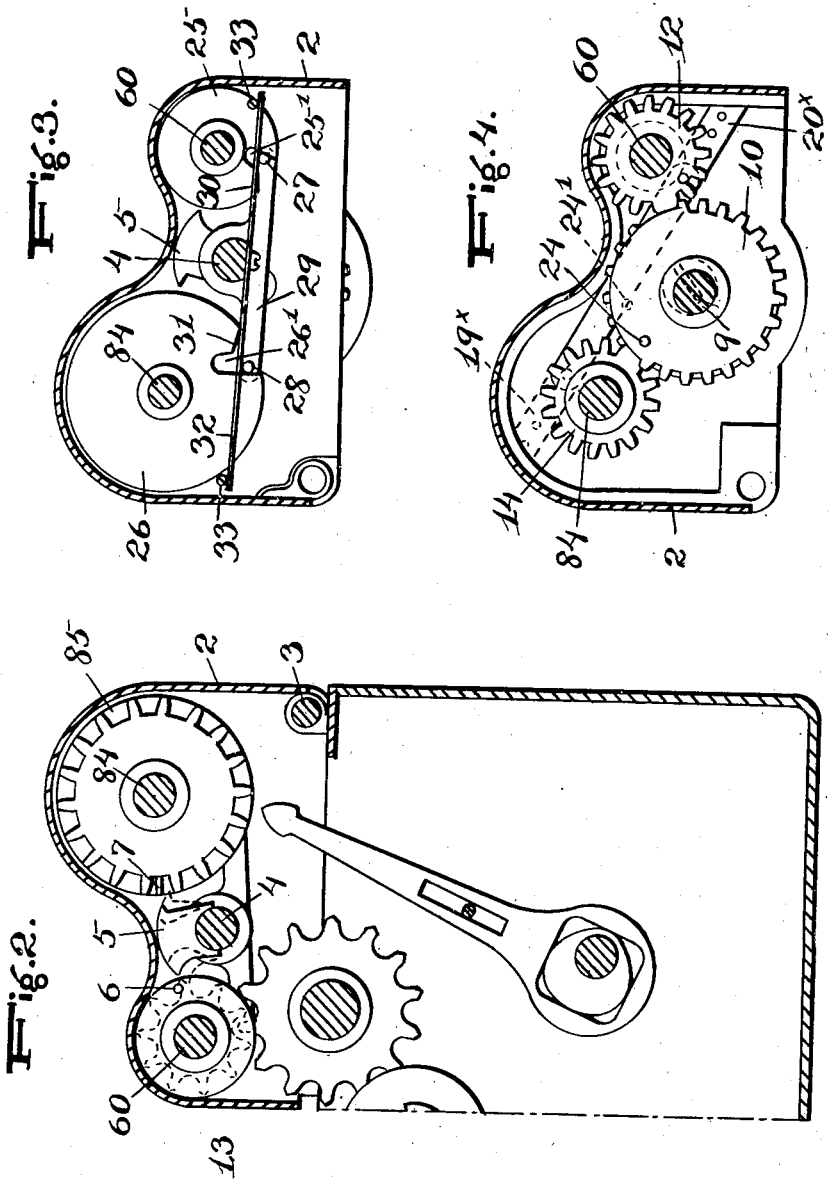
Witnesses
Stuart Hilder.
Francis W. Anderson.
Inventor
Frank S. Baldwin
By E. W. Anderson & Son
his Attorneys F. S. BALDWIN.
ZERO SETTING MECHANISM.
APPLICATION FILED SEPT. 24, 1914.
1,275,119.
Patented Aug. 6, 1918.
3 SHEETS—SHEET 3.
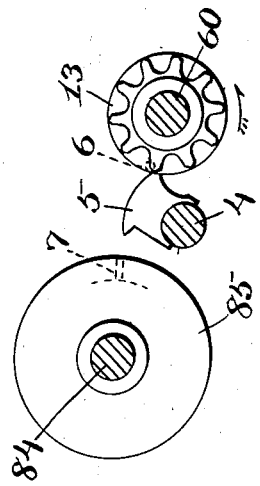
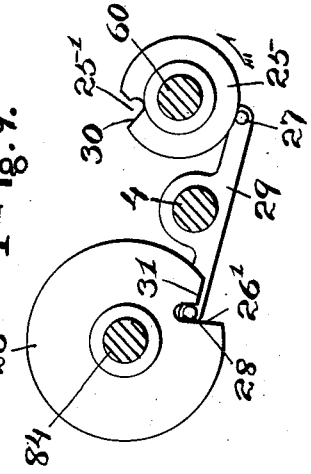
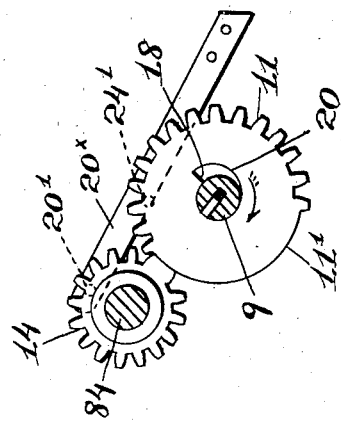
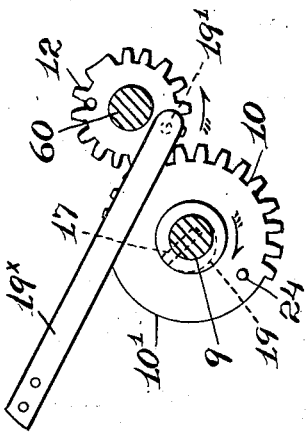
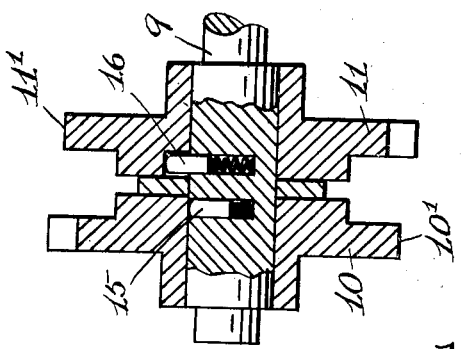
Witnesses
Stuart Hilder.
Frances M. Anderson.
Inventor
Frank S. Baldwin
By E. W. Anderson
his Attorneys

UNITED STATES PATENT OFFICE.

FRANK S. BALDWIN, OF NEW YORK, N. Y., ASSIGNOR TO MONROE CALCULATING MACHINE COMPANY, OF NEW YORK, N. Y., A CORPORATION OF NEW YORK.

ZERO-SETTING MECHANISM.

1,275,119.  Specification of Letters Patent.  Patented Aug. 6, 1918.

Application filed September 24, 1914. Serial No. 863,316.

*To all whom it may concern:*

Be it known that I, FRANK S. BALDWIN, a citizen of the United States, resident of New York, in the county of New York and State of New York, have made a certain new and useful Invention in Zero-Setting Mechanism; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Fig. 2 is a section on the line 2—2, Fig. 1, showing the radial projection upon the rock shaft as rocked to each side in dotted lines.

Fig. 3 is a section on the line 3—3, Fig. 1.

Fig. 4 is a section on the line 4—4, Fig. 1.

Fig. 5 is a detail section view of the clutch connection of the gears of the operating device.

Fig. 6 is a detail transverse section taken through the operating shaft and one of the numeral wheel shafts, showing the driving connection between these shafts, and the locking spring, the numeral wheel shaft being locked.

Fig. 7 is a similar companion section view taken through the operating shaft and the other unlocked numeral wheel shaft.

Fig. 8 is a detail transverse section of the rock shaft and the numeral wheel shafts, the rock shaft being rocked to one side to bring the radial projections into engagement with the gears of one of said shafts.

Fig. 9 is a detail transverse section of the rock shaft and the numeral wheel shafts, showing the means for rocking the shaft.

Figure 1:
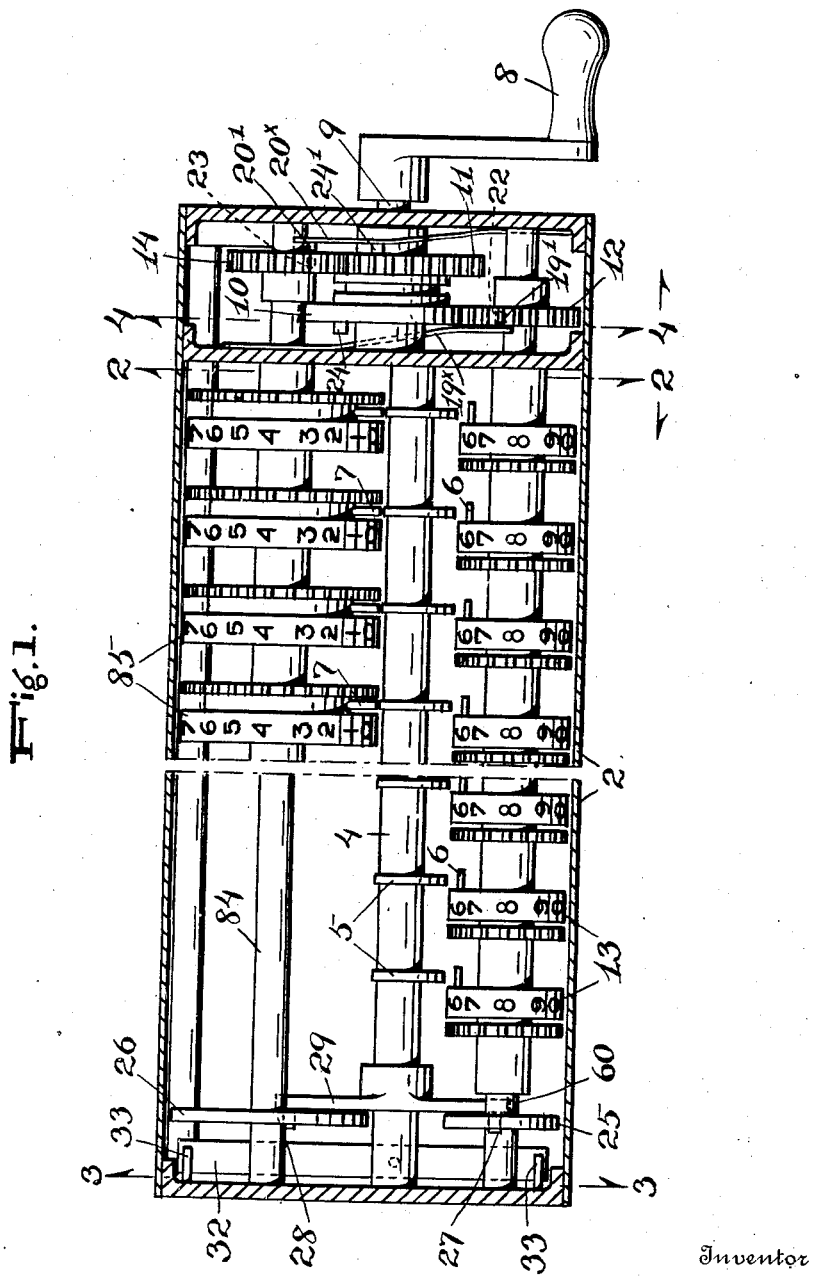
Figure 1 is a plan view of the invention as applied.

The invention has relation to zero-setting mechanism for calculating and other machines, having for its object the provision of simple and efficient means for setting back to zero two series of registering or numeral wheels by movement of an operating device or handle first in one direction and then in another or opposite direction, said means being capable of setting back to zero either series of wheels independently of the other series by movement of the handle in one direction.

The invention consists in the novel construction and combinations of parts, as hereinafter set forth.

In the accompanying drawings illustrating the invention, the numeral 2, indicates an endwise-shiftable carriage, pivoted in rear at 3, said carriage having mounted thereupon a series of numeral wheels 13, and a parallel series of numeral wheels 85, as in the type of machine of the Patent Number 1,080,245, dated December 2, 1913, to which this invention is shown as applied in substitution for the zero-setting means of said machine.

Between and parallel to the two series of numeral wheels 13 and 85 is located a rod or bar 4, having a series of radial projections 5, 5, spaced apart from each other and normally located without the path of movement of pins 6 and 7 of the numeral wheels, said bar having bearings in the carriage so that the bar and its projections may be rocked from one side to the other to bring the projections first within the path of movement of one series of wheels as 13, and as the bar is oppositely rocked, out of the path of movement of the pins of said wheels and within the path of movement of the pins of the other series of wheels, as 85.

An operating device or handle 8 is carried by a rotary shaft 9, said shaft having driving connection with the shafts 60 and 84 of the numeral wheels and being adapted upon movement of the handle in one direction to turn one series of wheels, and upon movement of the handle in the opposite direction to turn the other series of wheels, by suitable means, consisting preferably of two gears 10 and 11, upon the shaft 9, said gears driving gears 12 and 14 of the shafts 60 and 84 and having respectively oppositely acting clutch connections with the shaft 9, including spring-pressed pins 15 and 16 of the shaft and shoulders 17 and 18 of the wheel hubs, said shoulders having inclined approaches 19 and 20.

The shafts 60 and 84 are normally locked against being turned, and the lock is released previous to turning of the shafts and of the wheels thereupon, by means consisting usually of springs $19^x$ and $20^x$ of the carriage, said springs having pins $19'$ and $20'$ engaging seats 22 and 23 of the gears 12 and 14, a lateral tooth or projection 24 or $24'$ of the gear 10 or 11, having during the first part of the rotary movement of the gear, engagement with the spring 19ˣ or 20ˣ to move the spring to one side and release the pin thereof from its seat, the gears 10 and 11, having mutilated or smooth portions 10', 11', which will not act upon the gears 12 and 14 to turn the same during the first part of the rotary movement of the first-named gears, or while the unlocking is being effected.

Means are provided to rock the bar 4, at the start of the turning of the shaft 60 or 84 for the purpose stated, said means consisting preferably of a cam 25, upon shaft 60, and a cam 26, upon shaft 84, the cams having each a notch 25', 26', wherein fit normally pins 27, 28 located at opposite ends of cross arm 29, fast upon bar 4. As the shaft 60 or 84 starts to turn, the cam upon the shaft will turn therewith, the beveled wall 30 of 31 of the respective notch, acting upon the pin engaging the notch to rock the cross arm and the bar, the pin at the other end of the cross arm entering farther into the notch of the other cam, and the pin moved from the notch, riding upon the circumferential surface of the cam until a complete rotation of the shaft has been effected, when the pin will fall into the notch again and the cross arm and bar 4 assume or be rocked to normal position, under the influence of spring 32, carried by the bar 4, and bearing against pins 33 of the carriage.

In operation, the handle is moved first one complete rotation in one direction and then one complete rotation in the opposite direction, to set back both series of numeral wheels to zero, or the handle is moved one complete rotation in either direction to set back either series of wheels to zero. In this operation, the shafts 60 and 84, or either of them, are turned, the numeral wheels thereupon turning through frictional engagement with the shafts, and as the pins upon these wheels strike the radial projections of the rock bar, movement of the wheels is arrested, the pins being so arranged upon the wheels that when the movement of the wheels is so arrested, the wheels will be in position to expose the zero characters thereof through the carriage openings.

What I claim is:

1. In zero-setting mechanism, a series of numeral wheels having each a stop, a second series of numeral wheels having each a stop, an operating shaft having separate driving clutch connection with the wheels of each series, the clutches relating to the two series acting oppositely, and a movable member having connection with the operating shaft and moved thereby into the paths of the stops of the wheels of either series.

2. In zero-setting mechanism, parallel driven shafts, a series of numeral wheels upon each shaft and having each a stop, means for turning the respective shafts and the wheels thereon, including an operating shaft, means having connection with and released by the operating shaft for normally locking said driven shafts against being turned, and a movable member having connection with the operating shaft and moved thereby into the paths of the stops of the wheels of either of the parallel shafts.

3. In zero-setting mechanism, parallel driven shafts, a series of numeral wheels upon each shaft having each a stop, an operating shaft having separate driving connection, including a clutch, with each driven shaft, the clutches of the two shafts acting oppositely, and a movable member having connection with the operating shaft and moved thereby into the paths of the stops of the wheels of either driven shaft.

4. In zero-setting mechanism, parallel driven shafts, a series of numeral wheels upon each shaft having each a stop, an operating shaft having separate driving connection, including a clutch, with each driven shaft, the clutches of the two shafts acting oppositely, means having connection with and released by the operating shaft for normally locking the driven shafts against turning, and a movable member having connection with the operating shaft and moved thereby into the paths of the stops of the wheels of either driven shaft.

5. In zero-setting mechanism, parallel driven shafts having each at one end a cam provided with a notch, a series of numeral wheels upon each shaft having each a stop, means for turning the respective shafts and the wheels thereon, including an operating shaft, a rock shaft having a cross-arm provided with end pins normally engaging the notches of both cams, each notch having a cam wall engaging one of said end pins to rock the cross-arm and the shaft upon turning of one of the parallel shafts, each end pin riding upon the circumferential surface of the respective cam during the turning, said rock shaft having means for engagement with the stops of each series of wheels in order.

6. In zero-setting mechanism, parallel shafts, a series of numeral wheels upon each shaft having pins extending therefrom, an operating shaft, a rock shaft having projections spaced apart from each other and adapted for engagement with the pins of each series of numeral wheels in order, an operating device, and means whereby when said device is moved in one direction one parallel shaft and the wheels thereon will be turned and the rock shaft will be moved to one side, and when the operating shaft is rotated in the opposite direction the other parallel shaft and the wheels thereon will be turned and the rock shaft moved to the other side, to set both series of wheels back to zero.

7. In zero-setting mechanism, parallel shafts having each a gear wheel and a notched cam, a series of numeral wheels upon each shaft having pins extending therefrom, an operating shaft having mutilated gear wheels for engagement with the gears of the parallel shafts, said operating shaft having oppositely acting clutch connections with the gear wheels thereon, springs upon the carriage having locking engagement with the gears of the parallel shafts, means upon each mutilated gear to release the respective spring upon turning of the gear, a rock shaft having a series of radial projections spaced apart from each other and adapted for engagement with the pins of the numeral wheels of each parallel shaft respectively, said rock shaft having a cross arm engaging the cams of the parallel shafts to effect the rocking upon turning of each parallel shaft in order.

In testimony whereof I affix my signature, in presence of two witnesses.

FRANK S. BALDWIN.

Witnesses:
H. LARSEN,
P. F. HARNETT.